United States Patent
Anslot et al.

(10) Patent No.: US 10,206,095 B2
(45) Date of Patent: *Feb. 12, 2019

(54) SYSTEM AND METHOD FOR HANDLING INACTIVE SIM CARDS

(71) Applicant: GEMALTO SA, Meudon (FR)

(72) Inventors: Michel Anslot, Mougins (FR); Philippe Bouckaert, Biot (FR); Jean-Rene Bouvier, Biviers (FR)

(73) Assignee: GEMALTO SA, Meudon (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/316,365

(22) PCT Filed: Jun. 8, 2015

(86) PCT No.: PCT/EP2015/062715
§ 371 (c)(1),
(2) Date: Dec. 9, 2016

(87) PCT Pub. No.: WO2015/185755
PCT Pub. Date: Dec. 10, 2015

(65) Prior Publication Data
US 2017/0142572 A1    May 18, 2017

(30) Foreign Application Priority Data

Jun. 6, 2014  (EP) ..................... 14171611

(51) Int. Cl.
*H04B 1/38*      (2015.01)
*H04W 8/18*    (2009.01)
*H04W 4/50*    (2018.01)

(52) U.S. Cl.
CPC ............. *H04W 8/183* (2013.01); *H04W 4/50* (2018.02); *H04W 8/18* (2013.01)

(58) Field of Classification Search
CPC ........ H04W 8/245; H04W 60/00; H04W 8/18
See application file for complete search history.

(56) References Cited

U.S. PATENT DOCUMENTS

2010/0210306 A1* 8/2010 Larsson ................ H04M 15/00
                                                                    455/558
2013/0252584 A1* 9/2013 Cuadrat ................ H04L 67/125
                                                                    455/411

FOREIGN PATENT DOCUMENTS

WO    WO 2004/028191      *  4/2004   ............... H04Q 7/38

* cited by examiner

*Primary Examiner* — Stephen M D Agosta
(74) *Attorney, Agent, or Firm* — Hauptman Ham, LLP

(57) ABSTRACT

A method in a cellular communication network comprising the steps of: marking a SIM card as inactive when said SIM card has not been used for at least a quarantine duration, provisioning a recycler node by backing up managing parameters related to said inactive SIM card, in a database.

15 Claims, 8 Drawing Sheets

SYSTEM AND METHOD FOR HANDLING INACTIVE SIM CARDS

The technical domain of the invention is the domain of cellular communication network management. More precisely it concerns the management of SIM card that have not been used for a long time period.

In a cellular communication network a SIM card is associated to a subscription and allows a subscriber to use a terminal so as to connect to the cellular communication network and to use its communication services, such as voice calls, text messaging etc.

After a SIM card has been initialized, during a first attachment to the cellular communication network, said SIM card is known to the cellular communication network. Consequently some managing nodes in the cellular communication network, further named "relevant managing nodes", are provisioned so as to dedicate some of their memory resources to store "managing parameters" associated to said SIM card.

Said managing parameters are specific to said SIM card and are necessary to manage an attachment of said SIM card to the cellular communication network and the delivery of communication services. Among those managing parameters are: the International Mobile Subscriber Identifier (IMSI), the encryption key (Ki) and the Mobile Station Integrated Services Digital Network Number (MSISDN). The Home Location Register (HLR) for GSM, EDGE and UMTS networks or the Home Subscriber Server (HSS) for LTE networks is an example of relevant managing nodes. In the following description the term HLR/HSS will be used to encompass either a HLR or a HSS in function of the network wherein the invention is implemented.

Each SIM card provisioned in a network occupies storage resources and costs money to the cellular communication network operator.

National regulations generally allow cellular communication network operators to inactivate a SIM card and to de-provision relevant managing nodes by removing all records relating to said SIM card and the associated subscription and to reallocate the phone number, also referred to by the acronym MSISDN, after a given minimum quarantine duration has elapsed without said SIM card being used. Said quarantine duration most often counts in months, e.g. six months. The quarantine duration most often lasts between 30 days and 352 days. This means that, depending of the operators and national regulations, the SIM card can be considered as inactive after only 30 days of absence of activity in some countries, while in some other countries, the operator must wait 352 after the last activity of the cellular terminal before considering the SIM card as inactive. More often the quarantine duration lasts between 30 days and 180 days. Said inactivation is final and the SIM card can be thrown away.

Therefore, the SIM lifetime is limited, which represents a cost for the operator which can be compounded by high customer churn rates. Some customers change their operator and therefore their SIM card frequently and often in function of the release of attractive commercial offers from operators. As the customers tend to change their SIM card more frequently than before, the SIM card lifetime has turned out to decrease significantly and the operator must order more SIM cards for no visible revenue growth.

The document US2010/210306 provides a solution to re-activate a SIM card that has been de-activated while the cellular phone was attached to the network. To achieve that aim, this solution relies on a temporary IMSI ("IMSI-T") that is sent to the SIM card before during the de-activation phase and that replaces the previous IMSI of the SIM card.

One important drawback of this solution is that the cellular phone must be attached to the network during the during the de-activation phase.

A problem of the present invention is to propose a solution to limit the waste of SIM cards that have not been used for a period of time that exceeds the quarantine duration and while limiting at least some drawbacks of the above mentioned solutions.

To achieve this aim, according to an embodiment, the invention describes a method in a cellular communication network comprising a plurality of managing node that store an identifier of a subscription (MSISDN) and managing parameters related to a SIM card associated to a cellular terminal configured to be connected to the network, and at least a routing node configured to route requests between the cellular terminal and the managing nodes, one managing node among the plurality of managing nodes being a home location register/home subscriber server (HLR/HSS) and said managing parameters comprising at least a unique identifier (IMSI or ICCID) of the SIM card, wherein:
when said SIM card has not been used for at least a quarantine duration the method performs the following steps:
de-provisioning at least a given managing node among the plurality of managing nodes by removing from said given managing node at least the identifier of a subscription (MSISDN).
the method also comprises the following step performed when said SIM card has not been used for at least the quarantine duration optionally: modifying in a database of the HLR/HSS in charge of the SIM card the status of the SIM card from active to inactive; This step is optional.
the method also comprises the following step performed after or before said SIM card has not been used for at least the quarantine duration: provisioning a recycler node of the cellular communication network which comprises backing up in at least a database of said recycler node: at least some of said managing parameters.
after the provisioning of the recycler node, after the de-provisioning of at least the given managing node and upon reception at the recycler node of an attachment request comprising an identification number (IMSI, ICCID), uniquely identifying the SIM card, the method comprises reactivating the SIM card through performing the following steps:
allocating to the SIM card a new identifier of a subscription (new MSISDN) and associating the new identifier of a subscription (MSISDN) to the unique identifier (IMSI or ICCID);
re-provisioning said given managing node which comprises sending to said given managing node the association of the new identifier of a subscription (MSISDN) and the unique identifier (IMSI or ICCID);
optionally: modifying in the database of the HLR/HSS in charge of the SIM card the status of the SIM card from inactive to active. This step is optional.
Optionally, the managing node detects that the SIM card has not been used for at least a quarantine duration and then:
sends to the recycler node an instruction to perform to the step of provisioning the recycler node;
performs the de-provisioning step.
Optionally the provisioning of the recycler node may comprise backing up in the database of the recycler node at least one identification information for identifying the subscriber of said SIM card. The invention may optionally comprise, before the step of allocating a new identifier of a subscription and re-provisioning the managing node, a step of: identifying the subscriber based on identification data received from the SIM card or from a data server and on the identification information stored in the recycler node. Then the steps of allocating a new identifier of a subscription, re-provisioning the managing node are performed only if the identification step is successful.

The identification step is only facultative and the reactivation process can be achieved without performing any identification step.

According to an embodiment, during the step of identifying the subscriber, the identification data is entered by the user through a man machine interface of the cellular terminal.

According to an embodiment, the identification information comprises an answer to a secret question.

According to an embodiment, the identification data received from the user of the SIM card is sent by the user through a man machine interface of the cellular terminal.

Thus, according to an embodiment, the invention describes a method in a cellular communication network comprising the steps of: identifying a SIM card as inactive, provisioning a recycler node by backing up managing parameters related to said inactive SIM card in a database Therefore, to achieve this objective of the invention, an embodiment of the invention provides means both to a cellular network operator and to a cellular terminal user, to reuse a SIM card even once it has been inactivated.

Therefore, once the SIM card is considered as deactivated by the HLR/HSS or other managing node, the data associated to the SIM card are removed from the HLR/HSS or other managing node. Thus, the deactivated SIM card occupies less network resources. In addition, the identifier of the subscription associated to the SIM card, typically the MSISDN previously allocated to the subscription, can be re-allocated to another subscriber.

In case the subscriber wants to re-activate its SIM card, then the recycler node receives the attachment request from a data server or from the HLR/HSS. Optionally, but advantageously an identification of the subscriber is performed based on the identification information previously provisioned in its database. Therefore, the subscriber does not need to perform a longue and tedious identification process, which usually requires sending many documents and certificates (such as identification documents and proof of residence).

In case the identification process succeeds, a new identifier of a subscription, typically a new MSISDN, is allocated to the SIM card.

Then the data stored in the recycler node along with the new identifier of a subscription are provided back to the HLR/HSS.

Therefore, any further message from the re-activated SIM card is routed to the HLR/HSS. The SIM card is thereby reactivated.

Its IMSI has been kept unchanged while its initial MSISDN has been replaced.

Therefore, the invention allows reusing a deactivated SIM card which is cost saving for operators. It has turn out that for operators having millions of subscribers and having a churn rate of nearly 50%, the cost for buying new SIM cards for former customers that come back reaches millions and even dozens of millions of euros per year.

In addition, the invention allows reactivating a de-activated SIM card, which allows for instance a subscriber to easily go back to his previous operator without buying a new SIM card. The customer does not need to go to a SIM card retailer and can launch the reactivation process simply through switching on its cellular terminal associated to the de-activated SIM card or simply through a web portal.

The invention overcomes the barrier that often deters a customer to return to its former operator.

In case the method performs the identification process, then the invention brings another advantage over the prior art solutions. Indeed, with these known solutions, when a customer wants to use the operator of the de-activate SIM card, he has to start over the entire identification procedure that is mandatory to activate a SIM card for the first time. In many countries, depending on the national regulations, this activation process takes several days and requires many communications between the customer and the official agency in charge of enabling the activation. For instance, the customer has to supply the official agency with certified proof of identity and of residence and the official agency has to verify the validity of these documents. This represents an important burden for official administrations.

The invention alleviates the need for starting over the initial activation process while verifying that the user who wants to re-activate the de-activated SIM card is actually the person who initially obtained the activation allowance for the first activation of the SIM card.

The security of the process is therefore maintained while removing a useless additional identification process. The customer is not any more discouraged to return to its former operator.

Advantageously, the de-activation process can be completed while the cellular terminal is not attached to the network and while enabling a subsequent reactivation. Thus the invention does not need the cellular terminal to be attached to the network in order to allow the de-activation and a further activation Indeed, the method does not need to replace the IMSI of the SIM card by another IMSI such as a temporary IMSI. All the de-activation can be performed while the cellular terminal is not attached to the network, which is often the case when a SIM card has not been used for a long period of time.

Optionally, the invention may comprise any one of the following features and steps that can be taken separately or in combination:

According to an advantageous embodiment the provisioning step also comprises backing up in at least a database of said recycler node at least one identification information for identifying the subscriber of said SIM card.

In addition, the reactivating step of the SIM card also comprises identifying the subscriber based on identification data received from the user of the SIM card and on the identification information stored in the recycler node; and authorizing the reactivation only if the identification data received from the user of the SIM card matches the identification information stored in the recycler node.

The steps of reactivating the SIM card are performed at the recycler node

The attachment request is received from the SIM card (or more precisely from the cellular terminal associated to the SIM card), the identification number being the unique identifier (IMSI) and being incorporated in said attachment request.

One managing node among the plurality of managing nodes is a home location register/home subscriber server (HLR/HSS) and receiving at the recycler node an attachment request comprises receiving at the HLR/HSS an attachment request from the SIM card.

The given managing node is a HLR/HSS and de-provisioning at the HLR/HSS comprises removing from said HLR/HSS the identifier of a subscription (MSISDN) while keeping the unique identifier (IMSI).

The HLR/HSS is configured to transfer to the recycler node all messages sent by the SIM card until the re-activation is completed.

The recycler node is connected to or comprises a data server. The attachment request is received from the data server.

The data server is a web or internet server accessible by the user of the SIM card through the internet. The server provides the user with a web portal or a graphical user interface for inputting the identification number (IMSI, ICCID) and, in response, provides the recycler node with the identification number (IMSI, ICCID).

The data server is accessible by an agent of the operator and the agent of the operator receives over the phone the identification number (IMSI, ICCID) from the user of the SIM card and provides, in response, the recycler node with the identification number (IMSI, ICCID) via the data server.

According to an embodiment, the identification number is an Integrated Circuit Card Identifier (ICCID) which allows the user to easily access this number simply through reading it on the SIM. According to another embodiment the identification number is the IMSI.

The step of de-provisioning at least the managing node comprises removing from the HLR/HSS all the managing parameters related to said SIM card.

The given managing node is a HLR/HSS and de-provisioning at the HLR/HSS comprises removing from said HLR/HSS the identifier of a subscription (MSISDN) and removing also the unique identifier (IMSI, ICCID). Advantageously, this embodiment, allows de-provisioning both the MSISDN and the IMSI/ICCID from the HLR which enables saving more storage resources of the network.

The step of allocating to the SIM card a new identifier of a subscription (new MSISDN) comprises first asking the user for the new identifier of a subscription (new MSISDN) that must be allocated.

One managing node among the plurality of managing nodes is a HLR/HSS and wherein the recycler node is part of the HLR/HSS.

Preferably, the recycler node is a logical element. Preferably, the recycler node is a logical element that is embedded in the HLR/HSS.

The recycler node is a logical element that is executed by the HLR/HSS.

The step of de-provisioning at least said given managing node is applied to at least a managing node different from the HLR/HSS and comprises removing from said given managing node the unique identifier (IMSI or ICCID). Re-provisioning the given managing node comprises sending to said given managing node the association of the new identifier of a subscription (MSISDN) and the unique identifier (IMSI or ICCID).

According to an embodiment, the identification number of the SIM card is an International Mobile Subscriber Identifier (IMSI) or an Integrated Circuit Card Identifier (ICCID).

According to an embodiment, the step of de-provisioning the HLR/HSS or any other managing node, comprises removing from the HLR/HSS all the managing parameters (IMSI, Ki etc.) related to said SIM card, i.e., all the data related to said SIM card.

According to an embodiment, upon de-provisioning at least the HLR/HSS or any other managing node, the method comprising recycling the identifier of a subscription (MSISDN) of said SIM card in a phone number pool.

According to an embodiment, the unique identifier of the SIM card is an International Mobile Subscriber Identifier (IMSI) and the identifier of a subscription associated to the SIM card is a Mobile Station Integrated Services Digital Network Number (MSISDN).

According to an embodiment, the set of managing parameters comprises at least: the IMSI associated to the SIM card, an encryption key (Ki).

According to an embodiment, the set of managing parameters does not comprise the identifier of a subscription (MSISDN) associated to the SIM card, the identifier of a subscription (MSISDN) associated to the SIM card being thereby removed from the HLR/HSS or any other managing node upon de-provisioning the HLR/HSS or any other managing node without being provisioned in the recycler node. Therefore, once the MSISDN is removed from the managing nodes of the network, this MSISDN is not anymore associated to the de-activate SIM card is thereby available for any other SIM card that requires the allocation of a MSISDN.

According to an embodiment, the step of de-provisioning the HLR/HSS is performed after a successful completion of the step of provisioning the recycler node.

According to an embodiment, the step of provisioning the recycler node is triggered upon detection that the SIM card has not been used for at least a quarantine duration.

According to an embodiment, the step of provisioning the recycler node is performed in response to an instruction received from the HLR/HSS.

According to an embodiment, the HLR/HSS detects that the SIM card has not been used for at least a quarantine duration and then:
   sends to the recycler node an instruction to perform to the step of provisioning the recycler node;
   performs the de-provisioning step.

According to another feature of the invention, identifying the subscriber of said SIM card comprises asking the user of the SIM card a secret question, whose answer has been backed up in the recycler node before inactivation.

According to an embodiment, the identification information comprises an answer to a secret question. The identification information can be a personal identification number (PIN code) that is, before the SIM card is de-activated, provided to the user of the cellular phone or that is entered by the user of the cellular phone and then stored in the cellular communication network (for instance in the HLR/HSS). The identification data is sent by the user through the man machine interface of the cellular terminal when the user wants to re-activate the SIM card. According to another embodiment, the identification data is sent by the user through the web portal provided by a data server that is part of the recycler node or that is connected to the recycler node. Typically, the identification is successful if the identification data entered by the user matches the identification information stored in the recycler node.

The identification information can also be or comprise an answer to a secret question, the answer being entered by the user of the cellular phone and stored in the cellular communication (for instance in the CRM) network before the SIM card is de-activated.

According to an embodiment, before said SIM card has not been used for at least a quarantine duration at least one managing node of the cellular communication network taken among any one of: an authentication center (AuC), a customer relationship management (CRM), an operation support system (OSS) and a business support system (BSS), stores the identifier of a subscription (MSISDN). After said SIM card has not been used for at least a quarantine duration: de-provisioning said at least one managing node by removing from said least one managing node the identifier of a subscription (MSISDN).

According to another embodiment, after said SIM card has not been used for at least a quarantine duration: de-provisioning said at least one managing node by removing also from said at least one managing node the identifier of the SIM card (IMSI).

According to an embodiment, de-provisioning said at least one managing node comprises removing from said at least one managing node all the data related to the SIM card.

According to an embodiment, after allocating a new identifier of a subscription to the SIM card, the method comprises the step of: re-provisioning said at least one managing node by providing said at least one managing node with managing parameters related to said reactivated SIM card restored from database.

According to an embodiment, said re-provisioning step further comprises redirecting back any message emanating from or directed toward said reactivated SIM card to the previous addresses.

According to an embodiment, the method comprising the step of deleting any backed up managing parameters related to said reactivated SIM card out of the database.

According to an embodiment, said database is located in said recycler node.

According to an embodiment, the quarantine duration ranges between 30 days and 352 days and preferably between 30 days and 180 days. If the quarantine duration ends and that the SIM card has not been activated, then the SIM card is considered as inactive and can be re-activated according to the method of the invention.

Upon re-provisioning of the managing node (typically the HLR/HSS) (i.e., when the SIM card is re-activated), the recycler node sends to the HLR/HSS a notification to change in the HLR/HSS database the status of the SIM card from inactive to active The recycler node can be composed of a single hardware unit or can be composed of a plurality of hardware units.

According to an embodiment, the invention relates to a computer-program product that contains software program instructions, where execution of the software program instructions by at least one data processor results in performance of operations that comprise execution of at least the following steps:
when said SIM card has not been used for at least a quarantine duration the method performs the following steps:
identifying that a SIM card has not been used for at least a quarantine duration, then:
  provisioning a recycler node which comprises backing up in at least a database stored in at least a data storage device of said recycler node: managing parameters comprising at least a unique identifier of the SIM card (IMSI);
  optionally: modifying in a database of a HLR/HSS in charge of the SIM card the status of the SIM card from active to inactive;
  after the provisioning of the recycler node, and upon reception of an attachment request related to said SIM card:
    a. allocating a new identifier of a subscription (new MSISDN);
    b. providing to a managing node the set of managing parameters related to said reactivated SIM card restored from the database in association with the new identifier of a subscription (new MSISDN);
    c. optionally: modifying in the database of the HLR/HSS in charge of the SIM card the status of the SIM card from inactive to active.

Optionally, the provisioning of the recycler node also comprises storing in the database at least an identification information for identifying the subscriber of said SIM card. Optionally, upon reception of an attachment request, the following step is executed: identifying the subscriber based on identification data received from the user of the SIM card and on the identification information stored in the recycler node. The steps a., b., and c. are then executed only if the identification is successful.

For instance, the attachment request can be an attachment request message sent from the SIM Card over the network or can be a query sent from a data server (such as an internet server) connected to the recycler node.

According to an embodiment, the invention relates to a recycler node configured to be connected in a cellular communication network comprising a plurality of managing nodes that store an identifier of a subscription (MSISDN) and managing parameters related to a SIM card associated to a cellular terminal configured to be connected to the network, characterized in that:
  the recycler node is configured to execute the following steps when said SIM card has not been used for at least a quarantine duration:
  provisioning a database of the recycler node which comprises backing up in at least a database stored in at least a data storage device of said recycler node: a set of managing parameters comprising the unique identifier of the SIM card (IMSI) and optionally at least an identification information for identifying the subscriber of said SIM card;
  optionally: sending an instruction to modify in a database of a HLR/HSS in charge of the SIM card the status of the SIM card from active to inactive;
  the recycler node being also configured to execute the following steps after the provisioning of the recycler node, and
  optionally upon reception of the attachment request for said SIM card: identifying the subscriber based on identification data received from the user of the SIM card and on the identification information stored in the recycler node; and performing the following steps if the identification is successful; This identification step is only optional.
  allocating a new identifier of a subscription (new MSISDN);
  providing to a managing node the set of managing parameters related to said reactivated SIM card restored from the database in association with the new identifier of a subscription (new MSISDN);
  optionally: sending an instruction to modify in the database of the HLR/HSS in charge of the SIM card the status of the SIM card from inactive to active.

According to an embodiment, the invention describes a system for a cellular communication network comprising:
  at least a managing node that stores managing parameters related to a SIM card associated to a cellular terminal configured to be connected to the network:
  at least a recycler node according to the invention.

The SIM recycler node de-provisions the IMSI, even from the HLRHSS database, only for the embodiment wherein the re-activation involves a server. For the embodiment wherein the re-activation is managed by the HLR/HSS upon reception of an attachment request from the terminal, the IMSI must be kept in the HLR/HSS database.

Others features, details and advantages of the invention will become more apparent from the detailed illustrating description given hereafter with respect to the drawings on which:

FIG. 1 shows a schematic view of an embodiment of a typical cellular communication network, FIG. 2 shows a state diagram of a cellular terminal subscription, according to prior art, FIG. 3 shows a state diagram of a cellular terminal subscription, according to the invention, FIG. 4 shows a schematic view of an embodiment of a recycler node, FIG. 5 shows a diagram of an example of processes applied by a recycler node according to an embodiment of the present invention.

In the context of the present invention, the term terminal encompasses all terminals that are configured to communicate in a cellular communication network. The term terminal is equivalent to mobile terminal or cellular terminal or handset or mobile equipment or smartphone. A terminal can for instance be a mobile phone but also a digital pad, a digital tablet, a tablet computer or all equipment configured to communicate over a cellular communication network using a SIM card.

In the context of the present invention, the term SIM card encompasses all the embodiments of integrated circuits that store at least an identifier such as the international mobile subscriber identity (IMSI) and possibly at least a related key used to identify and authenticate subscribers on a cellular communication networks. The SIM card can be inserted in a removable manner in the cellular terminal or can be embedded in the cellular terminal without being removable. The term SIM card usually stands for subscriber identity module or subscriber identification module.

Figure 1:
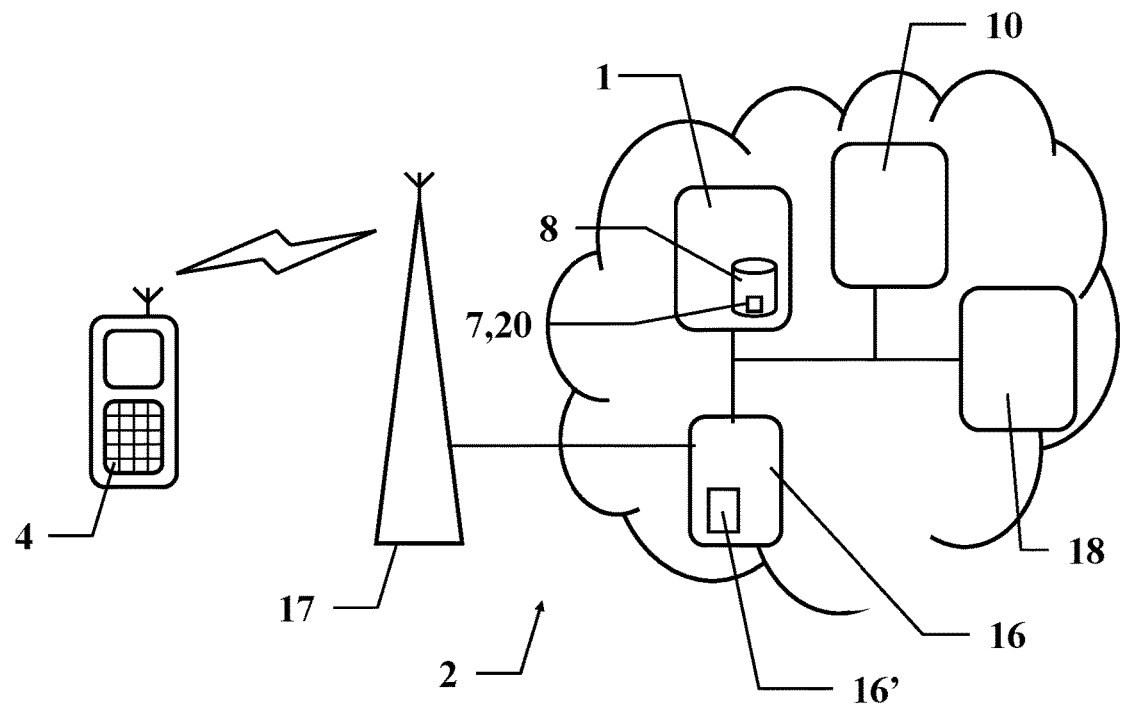

FIG. 1 shows a cellular communication network 2 in relation with cellular a terminal, here figured by its SIM card 4. In the description below, the cellular terminal and the SIM card 4 will be regarded as a single element referred to as the SIM card. Such a cellular communication network 2 comprises a core network, figured here by a cloud, comprising managing nodes 10, 18, generally interconnected by wires and also interconnected with at least one base station 17. Said base station 17 comprises radio communication devices to establish a wireless connection with at least one terminal.

When a terminal first establishes an attachment to the cellular communication network 2, it starts an initialization process. During said initialization process, the terminal identifies itself by means of identifiers pertaining to its SIM card 4. During said initialization process, some managing parameters 7 dedicated to said SIM card 4 are used. Said managing parameters 7 are specific to said SIM card 4 and are used by the cellular communication network 2 to handle said SIM card 4 when it uses the services of the cellular communication network 2. In particular, said managing parameters 7 are used to route messages having said SIM card as recipient or sender.

Each SIM card 4 is associated to at least an identifier of the SIM card which uniquely identifies the SIM card 4. This unique identifier of the SIM card can be for instance the International Mobile Subscriber Identifier (IMSI). The IMSI is stored in a memory of the SIM card 4.

The Integrated Circuit Card Identifier (ICCID) can also uniquely identify the SIM Card. The ICCID is stored in the SIM cards and/or is engraved or printed on the SIM card body. The ICCID of a SIM card cannot be modified.

The functions of the IMSI and ICCID are slightly different but they both uniquely identify the SIM card.

The present invention applies to the IMSI and/or the ICCID. However, for sake of clarity the detailed description below mainly refers to the IMSI.

When the SIM card 4 requests an attachment to the cellular communication network 2, it sends the IMSI to the cellular communication network 2 for identification. The first time the SIM card 4 requests an attachment, during the initialization, the IMSI needs to be defined in an Authentication Centre node, AuC. If the authentication is not accepted, the attachment between the SIM card 4 and the cellular communication network 2 is denied.

During said initialization process, a SIM card 4 is allocated an identifier of the subscription, which is usually referred to as the Mobile Station Integrated Services Digital Network Number (MSISDN). The MSISDN can be considered as the phone number 19 used by users of the cellular communication network 2.

Among all the managing nodes 10,18 of the cellular communication network 2, some managing nodes 10, here called "relevant managing nodes" 10, are more prone to need said managing parameters 7 and keep a record of said managing parameters 7. For example, such a relevant managing node 10 can be the HLR/HSS, a VLR, the AuC, an Operations Support System node, OSS, or a Business Support System node, BSS or a Signal Transfer Point node, STP or a Customer Relationship Management node (CRM). Thus when the SIM card 4 further attaches to the cellular communication network 2, any relevant managing node 10 can use its recorded copy of the managing parameters 7 related to said SIM card 4.

Either because they must comply to some national regulations or for commercial reasons, cellular communication network operators respect a quarantine duration 5 between the date $t_i$ of the last time a given SIM card 4 has been used and the date $t_f$ of its deactivation. Once the SIM card is considered as deactivated, the operator is allowed to entirely delete from the cellular communication network 2 records all its managing parameters.

In the context of the invention the last use, i.e., the last activity, of a SIM card may correspond to any one of the following events:

receiving/sending an attachment request for attaching the cellular terminal to the cellular communication network;

receiving/giving a call;

receiving/sending a short message service message (SMS) or a multimedia messaging service message (MMS);

receiving/sending data packets receiving/sending an update location message.

Figure 2:
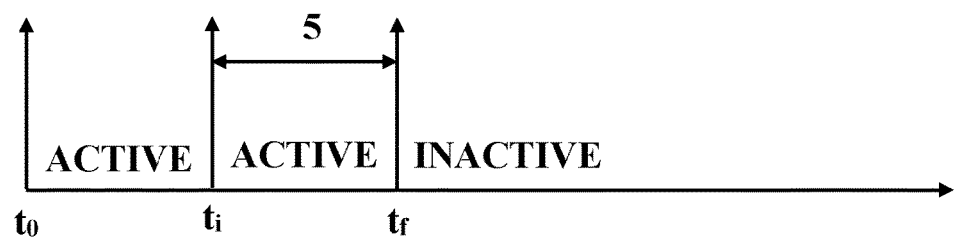

This prior art methods, currently used, is illustrated in FIG. 2. Once a SIM card 4 has gone through the initialization process at to, its state is considered as ACTIVE. Date $t_l$ indicates the date of the last usage of said SIM card 4 and starts a quarantine duration 5 observation period. If at date $t_f$ said quarantine duration 5 ends, without any further use of said SIM card 4 being observed, then the SIM card 4 can be de-activated and its state is then turned to INACTIVE. All the resources used in the cellular communication network 2, dedicated to said cellular SIM card 4, e.g. managing parameters 7 stored by said relevant managing nodes 10, can be deleted or de-provisioned and thus freed so as to be eventually reused. It is therefore like said SIM card 4 no longer exists in the cellular communication network 2. Said deletion is final with the solution of the state of the art.

Said final deletion leads to a waste of SIM card. An inactivated SIM card is of no use, and can be thrown away. If a user wants to reconnect to a cellular communication network 2, he/she must obtain a new SIM card, generally provided by the cellular communication network operator.

In some countries, regulations make the process to obtain a subscription and a SIM card 4 very long and complex. For instance, a candidate subscriber must provide identity documents, photos, proof of address, these documents are stored and checked by the cellular communication network operator, then some days later the future subscriber call back the cellular communication network operator, must answer some secret questions to have his/her SIM card activated. Such a process, mandatory, is very expensive for the cellular communication network operator. Moreover it can be disincentive for a former subscriber to revert back to a cellular communication network he/she had left, if all said process has to be done again.

Figure 3:
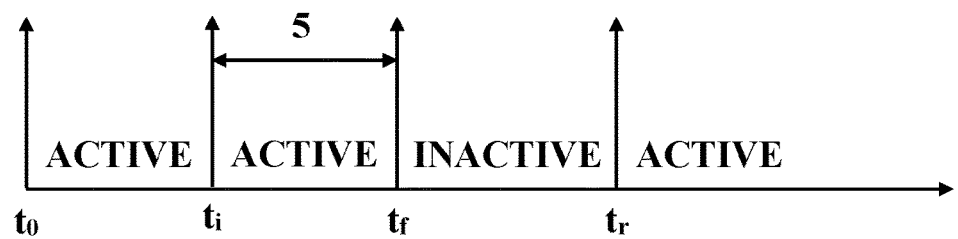

To overcome said disadvantages, a new method, is proposed by the invention, an embodiment of which being illustrated in FIG. 3. According to said new method, an INACTIVE SIM card can be, under some conditions, reactivated, that is, returned to an ACTIVE state, at date $t_r$.

Such a method is realized through the use of a new node connected to the cellular communication network, hereafter called a recycler node 1. Advantageously, said recycler node 1 can be located, contrary to relevant managing nodes 10, in a part of the cellular communication network 2 not incurring rent on a per SIM card basis.

According to an embodiment of the invention the recycler node 1 is an independent node of the cellular communication network 2. According to another and advantageous embodiment of the invention the recycler node 1 is part of or is embedded in another node such as the HLR/HSS.

Figure 4:
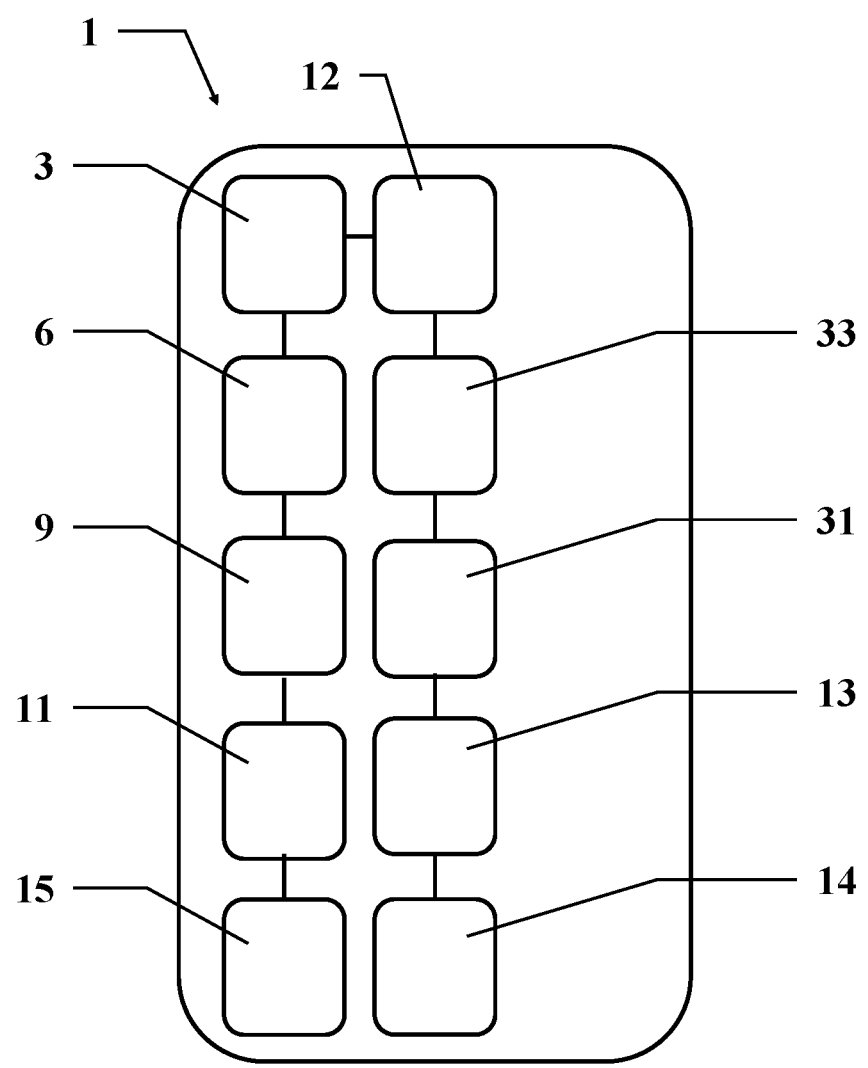
Figure 5:
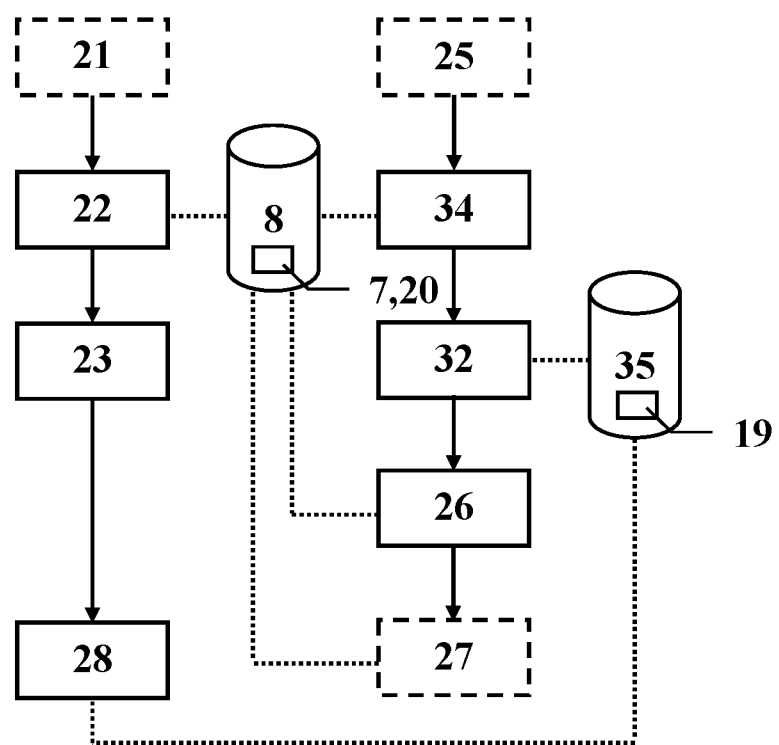

Such a recycler node 1, illustrated in FIG. 4 is configured to implement at least two processes: a preparation process and a reactivation process respectively illustrated in FIG. 5, left column and right column. The preparation process is executed when a SIM card 4 is about to be inactivated and prepares the cellular communication network 2 to be able to further reactivate said SIM card 4. The reactivation process actually applies the reactivation of said SIM card 4. A recycler node 1 is in charge of managing SIM cards 4 when they become INACTIVE so as to be able to reactivate them later in case a reactivation is requested.

The preparation process, illustrated in FIG. 5, left column, starts with an optional inactive marking step 21, e.g. applied by an inactive marking element 3, when it is determined that a SIM card 4 has not been used for a quarantine duration 5 or more.

Said determination may be made by the recycler node 1 itself or it can be made by another managing node 10, 18 and signalled to the recycler node 1. In this second case, the inactive marking element 3 only receives said information regarding the status of the SIM card 4. For instance, the recycler node receives said status information from the HLR/HSS 10. Said determination of the status of the SIM card 4 can typically be made using a history of the operations implying said SIM card 4, by comparing the date of the last operation and the current date to said quarantine duration 5. Following said determination, the inactive marking element 3, during an inactive marking step 21, marks said SIM card 4 as INACTIVE, to indicate its state became INACTIVE for further proceeding.

Said marking step 21 is only optional. The further steps can be initiated, without any marking step and upon reception of an instruction from a managing node or from the determination by the recycler node 1 itself that the SIM card 4 has been not active for a period of time that exceeds the quarantine duration 5.

Said marking step is only computational and intended to indicate to others processes that the state of said SIM card 4 has changed in order to trigger specific processings. Said marking shall not be construed as physically or even electronically marking said SIM card 4. A possible implementation is a numerical record associating both the IMSI of said SIM card 4 and an INACTIVE state indicator.

In fact the marking element 3 does not even need the SIM card 4 to be present in the cellular communication network 2, e.g. by being embedded into a powered on terminal, to proceed. This is advantageous in that the inactivation process may be applied even when a SIM card 4 is not attached to the cellular communication network 2 while allowing a subsequent re-activation process.

Next a provisioning step 22 is applied by a provisioning element 6. During said provisioning step 22, managing parameters 7 related to said inactive SIM card 4, are saved in a database 8 stored in at least a memory connected to the recycler node 1. The database 8, used to backup managing parameter 7 when a SIM card 4 is inactive, can be anywhere. However it is advantageously located in said recycler node 1 or at least in an area managed by said recycler node 1.

Said managing parameters 7 may be transmitted to the recycler node 1 from at least one of the relevant managing nodes 10 currently storing them.

For instance the IMSI and the MSISDN of the SIM card 4 are stored in the database 8 of the recycler node 1. Preferably, additional data such as the authentication keys Ki and identification information are also stored in the database 8 of the recycler node 1.

According to the embodiment wherein the recycler node 1 is part of the HLR/HSS, then the provisioning step is performed in the HLR/HSS.

According to a non limitative embodiment, in this case the database of the HLR/HSS is modified, excepted for the status of the SIM card. The MSISDN can be removed from one database of the HLR/HSS and provisioned in another database dedicated to the recycling.

Next a release or de-provisioning step 23 can be applied. Since the MSISDN 19 related to said inactive SIM card 4 is now backed up in said database 8, relevant managing nodes 10 can be de-provisioned by removing the MSISDN 19 from their memory. This can be triggered or performed by a module of the recycler node 1, referred to as the release or de-provisioning element 9.

According to an embodiment, the de-provisioning element 9, informs said relevant managing nodes 10, all along the cellular communication network 2, and informs them that they can consider said now inactive SIM card 4 as no longer being present in the cellular communication network 2. Accordingly, said relevant managing nodes 10 does not need to carry on storing the MSISDN 19 related to said inactive SIM card 4. Consequently said relevant managing nodes 10 can possibly delete the MSISDN 19 from their memory. The status INACTIVE can therefore be assigned to the SIM card and the tables of the managing nodes can assign the value VOID to the IMSI in place of the previous MSISDN.

Alternatively, the de-provisioning element 9 is in charge of de-provisioning at least some of the managing nodes 10, 18.

According to a specific embodiment, some or all the managing nodes also remove from their database the managing parameters 7 that are now stored in the recycler node 1. For instance, the BSS/OSS can remove the IMSI in addition to removing the MSISDN.

It should be noted that many operators rent or lease the managing nodes they use and that they are charged for each SIM card associated to parameters stored in the managing nodes. Therefore, removing from the managing nodes 10, 18 the managing parameters associated to non-active SIM cards allows operators to save a lot of money.

Since the SIM card 4 is now in an INACTIVE state, the identifier (MSISDN) associated to said cellular terminal subscription 4, referred to as the "phone number 19" can be freed. This may be done during a recycling step 28 by a recycler means 15. Said phone number 19 is made available and can for instance be placed in a phone number pool 35. Thereafter, said freed phone number 19 can be allocated to another SIM card when said other SIM card is performing its first activation.

Typically, the managing parameters 7 de-provisioned from the managing nodes 10, 18 comprise the IMSI.

For instance, the following managing parameters are de-provisioned from the: HLR/HSS: IMSI, MSISDN. In addition, the following managing parameters may optionally be de-provisioned from the HLR/HSS: ICCID (Integrated Circuit Card Identifier), profile for this IMSI.

AuC: IMSI, Ki.

BSS: IMSI, ICCID, MSISDN. In addition, the following managing parameters may optionally be de-provisioned from the BSS: profile associated for the user, such as the account.

OSS: IMSI, ICCID, MSISDN. In addition, the following managing parameters may optionally be de-provisioned from the OSS: profile associated for the user, such as the account.

CRM: IMSI, MSISDN. In addition, the following managing parameters may optionally be de-provisioned from the CRM: user information such as name, address, PUKs.

OTA server: IMSI, OTA keys.

Two alternative embodiments of the de-activation process will be described below in reference to FIGS. 6 and 8.

Once the recycler node 1 is provisioned and while the SIM card is de-activated, the managing nodes, such as the HLR/HSS can still route messages from the SIM card 4 to the recycler node 1 as it will be explained below in regard to the re-activation process. This is detailed below.

The reactivation process, illustrated in FIG. 5, right column, starts with a reactivation marking step 25. Said reactivation marking step 25 may be applied e.g. by a reactivation marking element 12 and is initiated when an attachment request emanating from an inactive SIM card 4 is received at the recycler node 1 or at the HLR/HSS 10 connected to the recycler node 1. Upon receiving said redirected attachment request the reactivation marking element 12 marks said SIM card 4 as reactivated. Said marking is only optional and is only computational. Said reactivated state is indicating that the SIM card 4 intends to attach to the cellular communication network 2 and thus must be replaced in an ACTIVE state again.

A first step of the reactivation process is the provision 32, done e.g. by a numbering module 31, of a new phone number 19, MSISDN, to the newly reactivated SIM card 4. Such a new phone number 19 can be obtained from a phone number pool 35. According to an optional embodiment, the MSISDN may be selected by the user, for instance among a set of MSIDN proposed by the operator. The new MSISDN 19 is associated in the database 8 to the unique identifier of the SIM card 4 (IMSI).

The reactivation process goes on with a re-provisioning step 26 of the relevant managing nodes 10, applied e.g. by a re-provisioning element 13. During said re-provisioning step 26, the new MSISDN 19 is provided to the managing nodes that has removed the former MSISDN from their database.

According to a specific embodiment, during the de-provisioning process the managing parameters 7 are removed from a managing node and are provisioned in the recycler node. Then, during the re-provisioning step 26, the managing parameters 7 are restored, that is, they are retrieved from database 8 where they were previously backed up and are provided back to the relevant managing nodes 10. After said re-provisioning step 26, the relevant managing nodes 10 are, with respect to said SIM card 4 as they were initially, before the SIM card 4 was turned into an INACTIVE state.

Typically, the managing parameters 7 re-provisioned in the managing nodes 10, 18 comprise the IMSI.

For instance, the following managing parameters are re-provisioned in the:

HLR/HSS: IMSI, MSISDN, ICCID. (Integrated Circuit Card Identifier), profile for this IMSI.

AuC: IMSI, Ki

BSS: IMSI, ICCID, MSISDN. In addition, the following managing parameters may optionally be de-provisioned from the BSS: profile associated for the user, such as the account.

OSS: IMSI, ICCID, MSISDN. In addition, the following managing parameters may optionally be de-provisioned from the OSS: profile associated for the user, such as the account.

CRM: MSISDN. In addition, the following managing parameters may optionally be de-provisioned from the CRM: user information such as name, address, PUKs.

OTA server: IMSI, OTA keys.

Another way to consider the reactivation process is to consider a new initialization is applied to the SIM card 4. The reception of a connection request emanating from an inactive SIM card 4 is followed by a processing applied by the recycler node 1, which can be compared to an initialization as if it was the first time said SIM card 4 connects to the cellular communication network 2, nonetheless a difference being that the IMSI used in this initialisation is the IMSI of a previously decommissioned SIM card. Another difference between the re-activation process of the invention and a conventional first activation relates to the optional user identification done through questions, the answers of which being already stored in managing nodes of the cellular communication network before the activation.

Since said SIM card 4 is now again in an ACTIVE state and its managing parameters 7 are available again to the relevant managing nodes 10 that may need them to manage a communication service for said SIM card 4, the recycler node 1 no longer needs to keep a copy of said managing parameters 7. Then during an optional but advantageous deletion step 27, that may be applied e.g. by deletion module 14, any backed up managing parameters 7 corresponding to said reactivated SIM card 4 can now be deleted out of the database 8. The SIM card 4 has now returned to the ACTIVE state, is managed by the relevant managing nodes 10 and is no longer known to the recycler node 1.

The reactivation process is in many ways, rather similar to the initialization process. Consequently some precautions can be taken before proceeding, to identify the inactive SIM card 4 candidate to reactivation and/or its user.

For this purpose, the recycler node 1 can further comprise an identification module 33 configured to apply an identification step 34. During said identification step 34 a dialog may be used to identify the SIM card 4 and/or its owner/subscriber. If the identification succeeds then the reactivation process can carry on, else the reactivation process is denied. Said dialog is intended to ask the holder of the terminal associated to the candidate SIM card 4 at least one question whose answer can indicate said holder is the legitimate owner/subscriber of said SIM card 4 that had previously undergone an entire identification process during its first activation and before it had been de-activated. Said dialog is typically applied through the man machine interface of said cellular terminal.

A first way to identify the owner of the SIM card 4 is to share with him/her a secret question whose answer is known to the cellular communication network 2. One way to do this is to record said answer 20 and possibly also said associated secret question, during the preparation process, when the SIM card 4 is about to be inactivated. This can be done, e.g. by the provisioning element 6 during the provisioning 22 step, and said answer 20, along with its associated secret question, can be stored in the database 8. The secret information stored in the network is referred to as the identification information.

The sharing of the secret question between the cellular communication network 2 and the user can be done through a dialog applied through the man machine interface of said terminal. Said sharing must be done at least before the SIM card 4 is turned INACTIVE. However, doing this when the SIM card 4 is about to be turned INACTIVE may not be the more practical, since at such a time, the SIM card 4 has not been used for a quarantine duration, and the user is probably not available. However, according to another embodiment, such a secret question may have been shared before, e.g. during initialization that is to say during the first activation of the SIM card 4. By doing so, said secret question, along with its answer 20, is already known from the cellular communication network 2 and available at the time of the preparation process when the SIM card 4 is turned into an INACTIVE state. The managing node 10 that stores that identification information can transmit it to the recycler node 1 for instance during the provisioning step of the recycler node 1. Preferably, the HLR/HSS stores the identification information and transmits it to the recycler node 1 before the de-activation process.

Then, during the reactivation process, the identification module 33 can ask said secret question to the holder. The answer provided by the user during the re-activation is referred to as the identification data. If said holder answers correctly by providing said previously stored answer 20, then said holder can be considered to be the regular owner/subscriber of said SIM card 4 for which access to the cellular network had been once allowed before the de-activation. Typically, the identification is successful if the identification data entered by the user matches the identification information stored in the recycler node.

Another way to identify the owner/subscriber of the SIM card 4 is to ask him/her to provide the PIN code of said SIM card 4. Said PIN code is a secret code, supposed to be known only to the owner/subscriber. Said PIN code is present in the SIM card 4 and can be securely verified by the cellular communication network 2.

This both ways and others can be combined to provides a higher level of identification before the reactivation can be allowed and proceeded.

Figure 6:
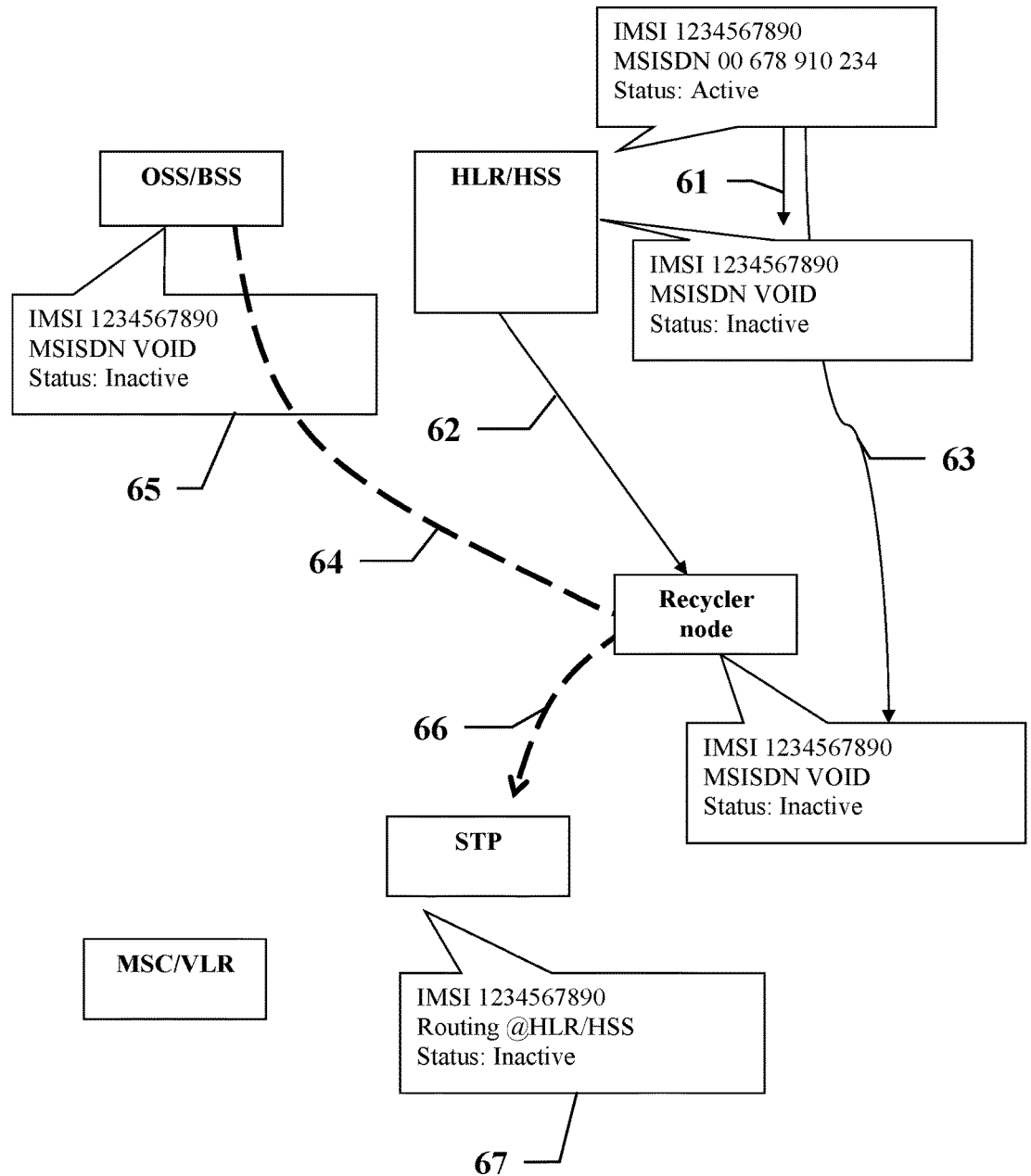
FIGS. 6 and 7 show some of the steps of respectively a de-activation process and a re-activation process according to an embodiment of the invention in a system wherein the user can re-activate his SIM card from the cellular terminal associated embedding the SIM card and through the cellular communication system.

FIG. 6 illustrates the de-activation process of a SIM card which comprises the provisioning of recycler node 1 and the de-provisioning of the managing nodes.

When the operator detects an inactive SIM card, it decommissions the MSISDN from its network elements (HLR, AuC, CRM . . . ).

For instance, and as illustrated by reference sign 61 of FIG. 6, the database of HLR/HSS that previously associated the MSISDN to the IMSI of the SIM card 4, associates, upon decommissioning, the value VOID to the IMSI instead of the MSISDN.

The HLR/HSS also provisions 62 a specific network element of the network, such as the recycler node 1 in charge of managing the inactive SIM cards. The database of the recycler node 1 also associates the unique identifier (typically the IMSI) of the SIM card 4 to the status INACTIVE, the value of the MSISDN being VOID.

Other managing nodes such as the OSS/BSS, CRM can also decommission 65 the MSISDN. This decommissioning 65 can be performed upon reception of an instruction from the HLR or from the recycler node 1 as illustrated by reference sign 64. Routing elements such as the STP can also decommission 67 the MSISDN upon reception of an instruction from the HLR or from the recycler node 1 as illustrated by reference sign 66.

It should be noted that although the MSISDN is decommissioned from the STP and possibly from other routing nodes, the IMSI of the SIM card is still associated to the address of the HLR/HSS so that messages from the SIM card 4 are still routed to the HLR/HSS.

The recycler node 1 can thus recycle the MSISDN in the MSISDN pool.

As detailed below, the recycler node 1 is a logical element and all its functionalities can be performed by the physical HLR/HSS.

Figure 7:
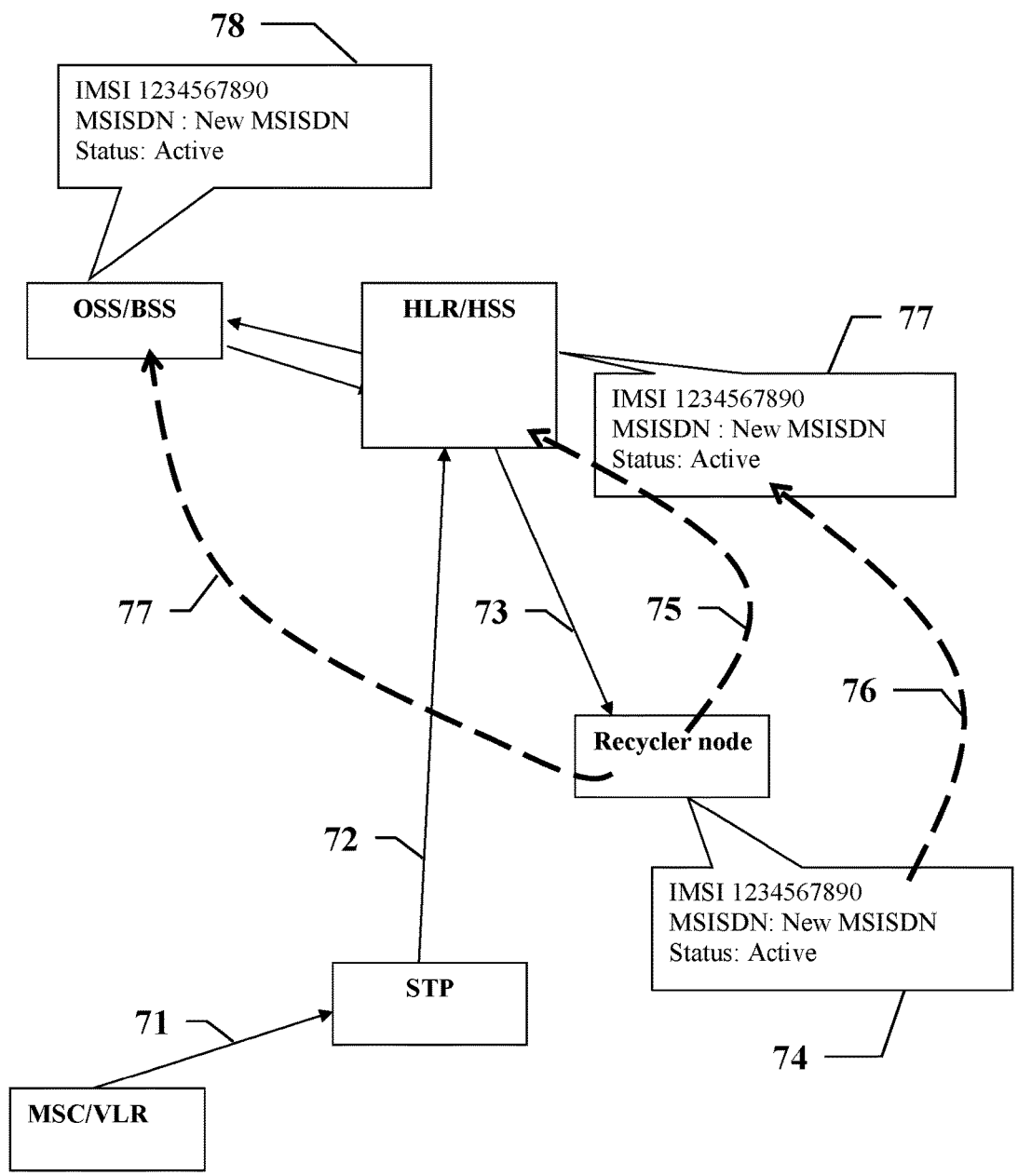

FIG. 7 depicts a re-activation process performed by the cellular communications network 2.

Once the SIM card is INACTIVE, whenever the subscriber attempts to re-attach the decommissioned SIM card 4 to the cellular communication network 2, for instance simply through inserting its decommissioned SIM card 4 into his cellular terminal, the network routes 71, 72 signaling attachment messages to the HLR/HSS which triggers 73 the recycler node managing the de-activated SIM card 4. Indeed, the routing elements 16 (STP for instance) have kept in their tables the address of the HLR/HSS in association with the IMSI.

Then, all subsequent messages from the SIM card 4 are first routed to the HLR/HSS which in response forwards them to the recycler node 1. The HLR/HSS knows that the message must be routed to the recycler node 1 since the status of the SIM card for the incoming messages is INAC- TIVE or since the MSISDN of the SIM card for the incoming messages are VOID.

In addition, in the embodiment wherein the recycler node 1 and the HLR/HSS are distinct, all messages sent by the recycler node 1 are first routed to the HLR/HSS which in response forwards them to the recycler node 1.

In the embodiment wherein the recycler node is an element of the HLR/HSS, the communications between the recycler node 1 and the SIM card 4 are simplified.

Preferably, once triggered by the HLR/HSS the recycler node 1 then sends to the subscriber a welcome message that prompts him to enter his PIN code and possibly additional identification data, such as his date of birth or the answer to a secret question in order to validate his identity. Therefore, all communications between the recycler node 1 and the SIM card transit by the HLR/HSS.

The PIN code and/or possible identification data are then compared to identification information previously stored in the network 2 and preferably stored in the recycler node 1. More generally, the identification information and PIN code can be previously stored by the operator as part of the identity registration procedure.

If the identity verification succeeds, then a new MSISDN is assigned to the previously decommissioned SIM card 4. Preferably, the subscriber can choose the new MSISDN. Preferably, the element in charge of allocating a new MSISDN is the recycler node 1.

The database of the recycler node 1 now associates 74 the unique identifier (typically the IMSI) of the SIM card 4 to the status ACTIVE, the value of the MSISDN being the new MSISDN.

The recycler node is then in charge of re-provisioning the managing nodes of the cellular communication network.

The new MSISDN is for instance sent 75 to the HRL/HSS which in turn can modify 77 its database. As shown by arrow 76, data contained in the database of the recycler node are now stored in the HLR/HSS's database. In particular, the database of the HLR/HSS now associates 77 the unique identifier (typically the IMSI) of the SIM card 4 to the status ACTIVE, the value of the MSISDN being now the new MSISDN. Therefore, when the HLR/HSS will receive a next message from the SIM card 4, such message will not anymore be forwarded to the recycler node 1 but will be handled as any conventional message sent from an active SIM card.

The new MSISDN is also sent 77 to other managing nodes such as the OSS/BSS, AuC, IN (intelligent network etc.) which in turn can modify 78 their database and provision the new MSISDN.

Once this is done, the subscribers can use his cellular terminal with his old SIM card 4.

Figure 8:
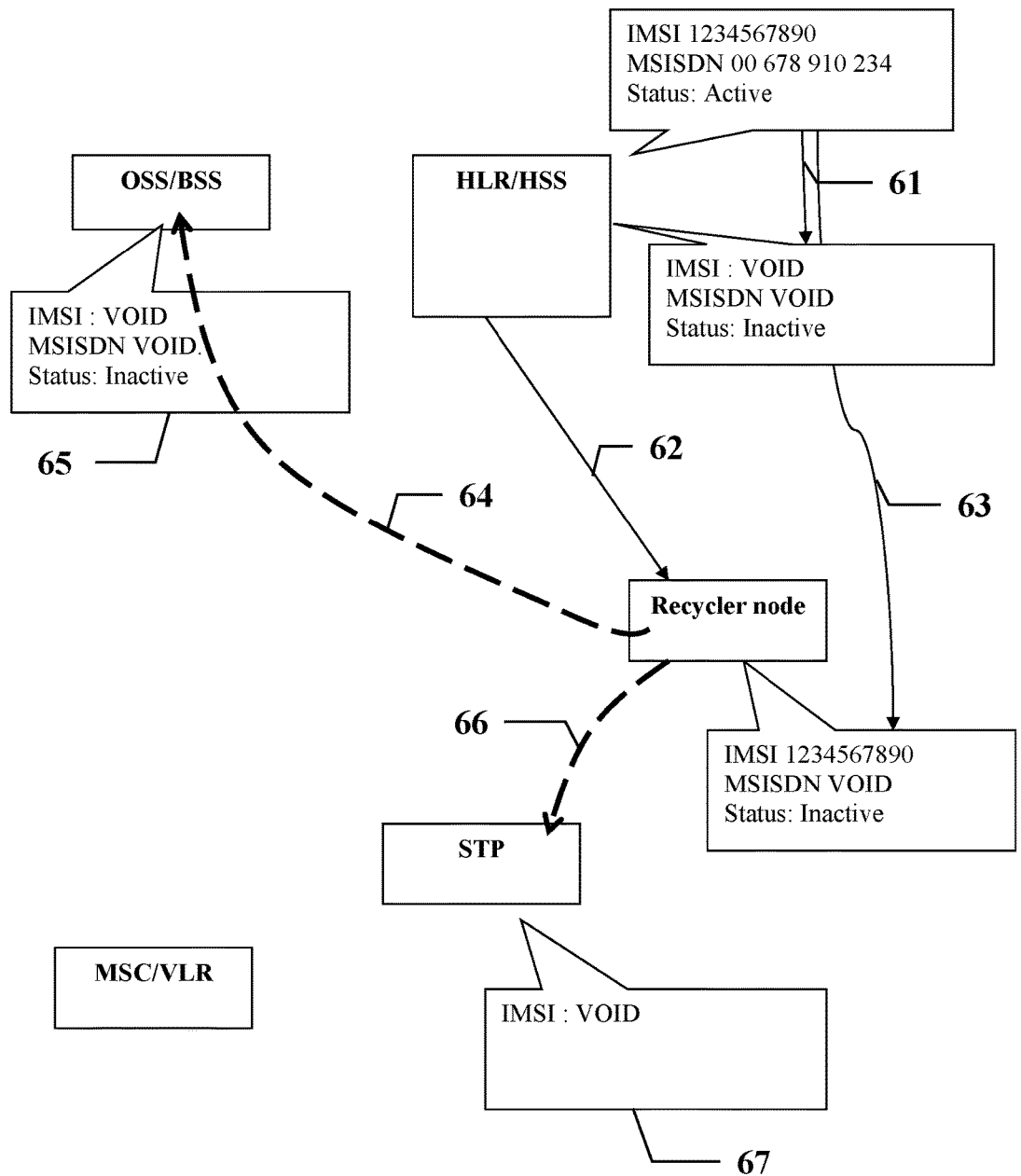
FIGS. 8 and 9 show some of the steps of respectively a de-activation process and a re-activation process according to an embodiment of the invention in a system wherein the user can re-activate his SIM card from a web portal.

FIG. 8 depicts a de-activation process performed by the cellular communications network 2. This de-activation process can for instance be performed similarly to the de-activation process described in reference to FIG. 6.

In details, when the operator detects an inactive SIM, it changes the HLR/HSS subscriber record cleaning the MSISDN, replacing it with a default MSISDN or void MSISDN. Preferably, the SIM recycler node removes call, data and SMS rights from the corresponding HLR/HSS profile as well as replaces the MSISDN with a default or a VOID MSISDN.

In addition, according to an advantageous and optional embodiment that differs from the one illustrated in FIG. 6, during the de-provisioning of the managing nodes of the network, managing parameters are decommissioned in addition to the MSISDN. For instance, as illustrated on FIG. 8, the IMSI can be removed 61, 65, 67 from the databases and tables of the managing nodes (HLR/HSS, OSS/BSS, STP etc.). Preferably, all data related to the de-activated SIM card 4 are removed. Thus, depending on the HLR/HSS pricing strategy, the operator can remove completely the subscriber from all network elements including the HLR/HSS. This allows freeing the resources of the network 2.

The SIM recycler node optionally moves the subscriber information from the BSS/OSS elements to the recycler node database for this decommissioned subscriber. From that point on the SIM recycler node is ready to re-activate the inactive SIM card 4 whenever the subscriber requests such re-activation as it will be described below.

Figure 9:
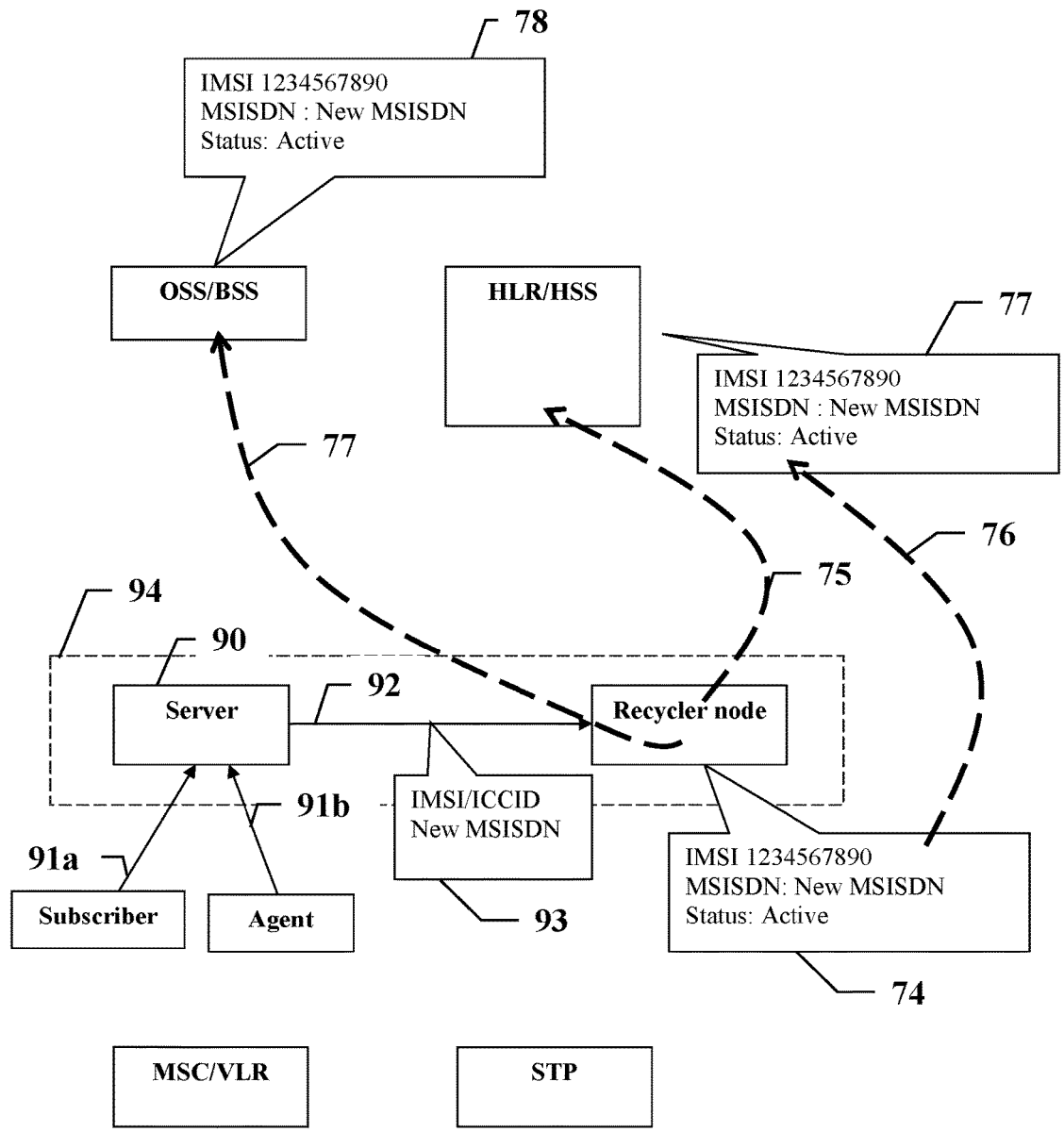

FIG. 9 depicts a re-activation process performed by the cellular communications network 2 and a data server that provides a web portal to the subscriber. This re-activation process can for instance be performed after the de-activation process described in reference to FIG. 8 or to FIG. 6.

The system comprises a data server 90 configured to provide the subscriber or an agent of the operator with a web portal.

The subscriber requests the reactivation of their decommissioned SIM cards through the web portal 91*a* or request it 91*b*, for instance over the phone to an agent who is connected to the web portal. The user provides an identification number that uniquely identifies the SIM Card. Said identification number can be the IMSI. According to an advantageous alternative embodiment, said identification number is the ICCID. The subscriber can read the ICCID written on the SIM card and provide. The ICCID is typically inputted through a graphical user interface of the web portal provided by the data server 90 or is communicated over the phone to the agent who in turn provides it to the data server 90.

The subscriber can also possibly provide additional information, such as his date of birth (previously stored by the operator as part of the identity registration procedure), to validate his identity (PUK code to unlock the SIM could be provided in the same time).

As for the de-activation process described in reference to FIG. 7, the subscriber can then select his subscription options and possibly choose a new MSISDN. These subscription options and request for choosing the MSISDN are requested by the data server 90.

The data server 90 is connected to the cellular communication system 90 and informs the recycler node 1 that the re-activation of the SIM card is requested.

Advantageously, the data server 90 and the recycler 1 are in charge of verifying the identity and offering a new MSISDN during the re-activation step. Thus, the data server can be seen as a module of the recycler node, as it is illustrated by reference sign 94. For instance, the server may request the recycler node to perform the identity verification and to offer/select a new MSISD.

The data server 90 provides the recycler node 1 with the new MSISDN in association with the IMSI (or ICCID).

Preferably, the recycler node 1 and the data server 90 form one single element of the cellular communication network as illustrated by reference sign 94.

From this point on, the recycler node 1 knows the new MSISDN and can trigger the re-provisioning of the various managing nodes and elements of the network 2. The steps 74-78 described with reference to FIG. 7 apply to this embodiment. In case some or all the managing nodes have been completely de-provisioned (in particular in case the IMSI has been removed), then the recycler node re-provisions all these managing parameters (IMSI, Ki etc.).

Thus, the operator provisioning system provisions the network elements (OSS, BSS, IN . . . ) so that the next attachments go directly to these elements.

In particular, the database of the HLR/HSS now associates 77 the unique identifier (typically the IMSI) of the SIM card 4 to the status ACTIVE, the value of the MSISDN being now the new MSISDN.

Then, the subscriber can use its cellular terminal with their old SIM card. The subscriber is invited to insert its decommissioned SIM card into its cellular terminal and then receives a welcome message.

It should be noted that a single system can be configured to support the two alternative embodiments described in reference to FIGS. 6-7 and 8-9.

The recycler node 1 can be composed of a single hardware unit or can be composed of a plurality of hardware units.

Figure 10:
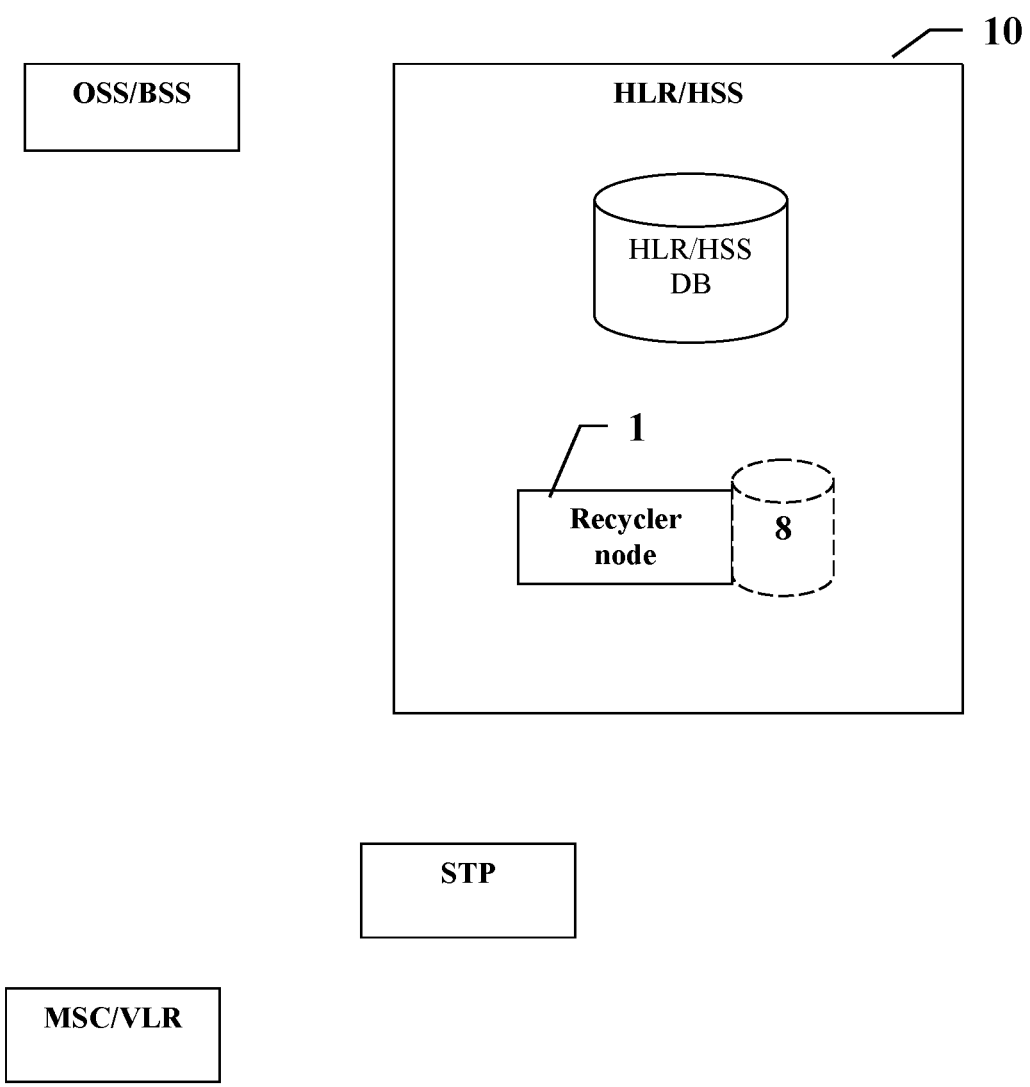
FIG. 10 illustrates an embodiment wherein the recycler node is a part of the HLR/HSS.

Whatever is the composition of the recycler node 1 this node can be an independent node of the cellular communication network 2 or it can alternatively and advantageously be formed by or be part of or be embedded in the HLR/HSS. FIG. 10 illustrates an embodiment wherein all functionalities of the recycler node are played by the HLR/HSS. Therefore, the recycler node 1 is a logical element and all its functionalities and steps described in the present description as being performed by the recycler node are may be performed by the HLR/HSS incorporating the recycler node.

From the above description, it appears clearly that the invention provides many advantages. Indeed, the SIM card 4 can be re-activated while ensuring that the current holder of the SIM card 4 is actually the subscriber for which access to the network had been granted previously to the de-activation. Thus, the longue and tedious identification process that is mandatory at the first activation of the SIM card 4 does not need to be performed again. The operator, the official agency and the customer save a lot of time and money.

In addition the customer is more prone to go back to its previous operator.

A further advantage is that the de-activated SIM card are not wasted and can be used again which is environment friendly and is money saving for the operator.

While there is shown and described the present preferred embodiment of the invention, it is to be distinctly understood that this invention is not limited thereto but may be variously embodied to practice within the scope of the following claims.

Although the various elements of the recycler node have been depicted on FIG. 4 as pertaining to the same node, the description shall not be construed as describing a physical node performing all the processes described in relation to FIG. 4. Indeed, the invention encompasses all embodiments where various and possibly independent modules are in charge of performing the processes of FIG. 4.

The invention claimed is:

1. A method in a cellular communication network comprising a plurality of managing node that store an identifier of a subscription (MSISDN) and managing parameters related to a SIM card associated to a cellular terminal configured to be connected to the network, one managing node among the plurality of managing nodes being a home location register/home subscriber server (HLR/HSS) and said managing parameters comprising at least an International Mobile Subscriber Identifier (IMSI) of the SIM card, wherein:

when said SIM card has not been used for at least a quarantine duration the method performs the following steps:

de-provisioning at least a given managing node among the plurality of managing nodes by removing from said given managing node at least the identifier of a subscription (MSISDN) characterized in that the method also comprises the following steps performed when said SIM card has not been used for at least the quarantine duration:

modifying in a database of the HLR/HSS in charge of the SIM card the status of the SIM card from active to inactive;

provisioning a recycler node which comprises backing up in at least a database of said recycler node: at least some of said managing parameters comprising at least said IMSI and at least an identification information for identifying the subscriber of said SIM card;

after the provisioning of the recycler node, after the de-provisioning of at least the given managing node and upon reception at the recycler node of an attachment request comprising an identification number, uniquely identifying the SIM card, the method comprises reactivating the SIM card through performing the following steps:

identifying the subscriber based on identification data received from the user of the SIM card and on the identification information stored in the recycler node; and authorizing the reactivation only if the identification data received from the user of the SIM card matches the identification information stored in the recycler node;

allocating to the SIM card a new identifier of a subscription and associating the new identifier of a subscription to said IMSI;

re-provisioning said given managing node which comprises sending to said given managing node the association of the new identifier of a subscription and said IMSI;

modifying in the database of the HLR/HSS in charge of the SIM card the status of the SIM card from inactive to active; and wherein receiving at the recycler node an attachment request comprises any one of:

first receiving at the HLR/HSS an attachment request from the SIM card and then sending the attachment request from the HLR/HSS to the recycler node, and the attachment request is received from a data server, the recycler node being connected to or comprising the data server, wherein the data server is any one of: an internet server accessible by the user of the SIM card through the internet, the data server being configured to: provide the user with a web portal for inputting the identification number and, in response, to provide the recycler node with the identification number, and a data server accessible by an agent of the operator, the agent of the operator receiving the identification number from the user of the SIM card and providing, in response, the recycler node with the identification number via the data server; and wherein the step of de-provisioning at least said given managing node is applied to at least a managing node different from the HLR/HSS and comprises removing from said given managing node said IMSI and wherein re-provisioning the given managing node comprises sending to said given managing node the association of the new identifier of a subscription and said IMSI, and wherein said step of provisioning the recycler node is performed at any one of:

after that said SIM card has not been used for at least a quarantine duration, or before that said SIM card has not been used for at least a quarantine duration.

2. The method according to claim 1 wherein the attachment request is received from the SIM card, the identification number being said IMSI and being incorporated in said attachment request.

3. The method according to claim 1 wherein the given managing node is a HLR/HSS and wherein de-provisioning the HLR/HSS comprises removing from said HLR/HSS the identifier of a subscription while keeping said IMSI.

4. The method according to claim 1 wherein the agent of the operator receives the identification number from the user of the SIM card over the phone.

5. The method according to claim 1 wherein the identification number is any one of: an Integrated Circuit Card Identifier or said IMSI.

6. The method according to claim 1 wherein the step of de-provisioning at least the managing node comprises removing from the HLR/HSS all the managing parameters related to said SIM card which comprises removing from the HLR/HSS said IMSI.

7. The method according to claim 1 wherein the given managing node is a HLR/HSS and wherein de-provisioning the HLR/HSS comprises removing from said HLR/HSS the identifier of a subscription and removing also said IMSI.

8. The method according to claim 1 wherein the step of allocating to the SIM card a new identifier of a subscription comprises first asking the user for the new identifier of a subscription that must be allocated.

9. The method according to claim 1 wherein one managing node among the plurality of managing nodes is a HLR/HSS and wherein the recycler node is a logical element that is executed by the HLR/HSS.

10. The method according to claim 1 wherein one managing node among the plurality of managing nodes is a HLR/HSS, wherein the step of de-provisioning at least said given managing node is applied to at least a managing node different from the HLR/HSS and comprises removing from said given managing node said IMSI and wherein re-provisioning the given managing node comprises sending to said given managing node the association of the new identifier of a subscription and said IMSI.

11. The method according to claim 1 wherein the identification number of the SIM card is said IMSI or an Integrated Circuit Card Identifier and wherein the identifier of a subscription associated to the SIM card is a Mobile Station Integrated Services Digital Network Number.

12. The method according to claim 1 wherein during the step of identifying the subscriber, the identification data is entered by the user through a man machine interface of the cellular terminal.

13. The method according to claim 1 wherein the identification information comprises an answer to a secret question.

14. A computer-program product stored on a non-transitory computer readable medium that contains software program instructions, where execution of the software program instructions by at least one data processor results in performance of operations that comprise execution of at least the following steps:
when said SIM card has not been used for at least a quarantine duration the method performs the following steps:
identifying that a SIM card has not been used for at least a quarantine duration, then:
provisioning a recycler node which comprises: backing up in at least a database stored in at least a data storage device of said recycler node: managing parameters comprising at least an International Mobile Subscriber Identifier of the SIM card;
modifying in a database of a HLR/HSS in charge of the SIM card the status of the SIM card from active to inactive;
after the provisioning of the recycler node, and upon reception of an attachment request for said SIM card;
allocating an identifier of a subscription;
providing to a managing node the set of managing parameters related to said reactivated SIM card restored from the database in association with the new identifier of a subscription;
modifying in the database of the HLR/HSS in charge of the SIM card the status of the SIM card from inactive to active, and
wherein receiving at the recycler node an attachment request comprises any one of:
first receiving at the HLR/HSS an attachment request from the SIM card and then sending the attachment request from the HLR/HSS to the recycler node, and
the attachment request is received from a data server the recycler node being connected to or comprising the data server, wherein the data server is any one of:
an internet server accessible by the user of the SIM card through the internet, the data server being configured to: provide the user with a web portal for inputting the identification number and, in response, to provide the recycler node with the identification number, and
a data server accessible by an agent of the operator, the agent of the operator receiving the identification number from the user of the SIM card and providing, in response, the recycler node with the identification number via the data server,
and wherein the step of de-provisioning at least said given managing node is applied to at least a managing node different from the HLR/HSS and comprises removing from said given managing node said IMSI and wherein re-provisioning the given managing node comprises sending to said given managing node the association of the new identifier of a subscription and said IMSI,
and wherein said step of provisioning the recycler node is performed at any one of:
after that said SIM card has not been used for at least a quarantine duration, or
before that said SIM card has not been used for at least a quarantine duration.

15. A Recycler node configured to be connected in a cellular communication network comprising a plurality of managing nodes that store an identifier of a subscription and managing parameters related to a SIM card associated to a cellular terminal configured to be connected to the network, the managing parameters comprising at least an International Mobile Subscriber Identifier of the SIM card wherein:
the recycler node is configured to execute the following steps when said SIM card has not been used for at least a quarantine duration:
provisioning a database of the recycler node which comprises backing up in at least a database stored in at least a data storage device of said recycler node: the set of managing parameters comprising said IMSI;

sending an instruction to modify in a database of a HLR/HSS in charge of the SIM card the status of the SIM card from active to inactive;

the recycler node being also configured to execute the following steps after the provisioning of the recycler node, and upon reception of an attachment request for said SIM card;

allocating a new identifier of a subscription;

providing to a managing node the set of managing parameters comprising said IMSI, related to said reactivated SIM card and restored from the database, in association with the new identifier of a subscription;

sending an instruction to modify in the database of the HLR/HSS in charge of the SIM card the status of the SIM card from inactive to active, wherein receiving at the recycler node an attachment request comprises any one of:

receiving from the HLR/HSS the attachment request emanating from the SIM card, and receiving the attachment request from a data server, the recycler node being connected to or comprising a data server, the data server providing the recycler node with the identification number, wherein the data server is any one of:

an internet server accessible by the user of the SIM card, and a data server accessible by an agent of the operator, and wherein the step of de-provisioning at least said given managing node is applied to at least a managing node different from the HLR/HSS and comprises removing from said given managing node said IMSI and wherein re-provisioning the given managing node comprises sending to said given managing node the association of the new identifier of a subscription and said IMSI, and wherein said step of provisioning a database of the recycler node is performed at any one of:

after that said SIM card has not been used for at least a quarantine duration, or before that said SIM card has not been used for at least a quarantine duration.

\* \* \* \* \*